United States Patent
DeBiase

(10) Patent No.: US 9,764,219 B2
(45) Date of Patent: Sep. 19, 2017

(54) SKATEBOARD DECK

(71) Applicant: Logan DeBiase, Chicago, IL (US)

(72) Inventor: Logan DeBiase, Chicago, IL (US)

( * ) Notice: Subject to any disclaimer, the term of this patent is extended or adjusted under 35 U.S.C. 154(b) by 0 days.

(21) Appl. No.: 14/830,167

(22) Filed: Aug. 19, 2015

(65) Prior Publication Data
US 2016/0051888 A1 Feb. 25, 2016

Related U.S. Application Data

(60) Provisional application No. 62/038,843, filed on Aug. 19, 2014.

(51) Int. Cl.
| | |
|---|---|
| *A63C 17/00* | (2006.01) |
| *A63C 17/01* | (2006.01) |
| *A63C 17/26* | (2006.01) |
| *B32B 7/12* | (2006.01) |
| *B32B 21/14* | (2006.01) |
| *B32B 3/28* | (2006.01) |
| *B32B 21/04* | (2006.01) |

(52) U.S. Cl.
CPC ............ *A63C 17/01* (2013.01); *A63C 17/015* (2013.01); *A63C 17/262* (2013.01); *B32B 3/28* (2013.01); *B32B 7/12* (2013.01); *B32B 21/14* (2013.01); *A63C 2203/42* (2013.01); *B32B 21/042* (2013.01)

(58) Field of Classification Search
CPC ........................................ A63C 17/01–17/017
See application file for complete search history.

(56) References Cited

U.S. PATENT DOCUMENTS 6,193,276 B1 * 2/2001 Sottile .................... A63C 17/01
280/816

* cited by examiner

*Primary Examiner* — Erez Gurari
(74) *Attorney, Agent, or Firm* — Richards Patent Law P.C.

(57) ABSTRACT

A skateboard deck includes: a body with a top surface and a lateral centerline, the body including a nose portion with a nose apex and a tail portion with a tail apex, wherein the nose apex and the tail apex are above the top surface of the body; wherein the total length of the body spans from a forwardmost surface of the body located along the nose portion to a rearmost surface of the body located along the tail portion, further wherein the nose apex is located between the length defined by the forwardmost surface of the body and the lateral centerline and the tail apex is located between the length defined by the rearmost surface of the body and the lateral centerline.

12 Claims, 3 Drawing Sheets

SKATEBOARD DECK

BACKGROUND OF THE INVENTION

The present subject matter relates generally to a skateboard deck, specifically to a skateboard deck designed to improve the rider's ability to safely perform tricks.

Skateboarding is a challenging athletic activity, particularly as a skater moves past using the board for transportation and towards performing tricks. Because of the competitive nature of the sport, skaters are constantly challenged to invent new tricks and maneuvers, often with increasing degrees of difficulty and risk. As a result, many novices find the sport daunting and difficult to master and expert riders are looking for new ways to stretch the limits of their athletic ability and showmanship.

One challenge in skating is that the skater's feet are typically not connected to the board other than by the force of gravity. Because there is nothing holding a rider's feet in place on the board, many airborne tricks require exceptional skill and balance and/or the skater to reach down and grab the board by hand.

For example, on the more basic side of the spectrum of skating tricks, in an "Ollie" maneuver, the rider shifts his weight to the rear of the board while using friction and his front foot to urge the front of the skateboard upward while staying in contact with the board. Once airborne, the rider attempts to return the attitude of the board to level and to get his body's center of gravity back over the skateboard to return to a state of balance and control. Very advanced riders use the "Ollie" maneuver to jump curbs or railings. The difficulty with the "Ollie" maneuver and other airborne maneuvers is that it is hard to control the skateboard and keep the board in contact with the rider's feet. Towards the more advanced range, skaters in a half-pipe often launch themselves above the bowl to perform aerial tricks such as 720s, airwalks, backside airs, McTwists, etc. In these aerial tricks, it is nearly always essential for the skater to grab the board mid-air. As a result, especially compared to skiing or snowboarding where the rider is bound to the board, a skater's ability to perform airborne tricks is limited. Being able to expand past these limits would open up skaters to perform new tricks with even greater degrees of showmanship.

Conventional solutions to prevent a rider's feet from losing contact with skateboard platform involve straps, poles, handles, belts, magnets, and other elements in an attempt to make skateboarding and skateboarding tricks easier. However, the conventional solutions require the use of a user's hands or locking a user's feet onto the board, both of which create safety problems and may detract from the showmanship element of the sport.

For example, one conventional solution includes a vertical upright assembly extending from the skateboard platform, such that a rider may grab the upright assembly to maintain contact with the board while airborne. However, the vertical upright assembly may be quite the safety hazard upon an accident. For example, the vertical upright assembly may impale the rider upon a loss of balance or accident.

Another conventional solution includes including magnets within the skateboard deck and within the rider's shoes in order to maintain contact between the rider's shoes and the skateboard. Other solutions involve strapping a rider's feet to the skateboard such that the skateboard maintains contact with the rider's feet while airborne. However, these solutions create safety hazards upon an accident. For example, if the rider's hands or feet are restricted during a fall, the rider cannot break his fall. In addition, if a rider's feet are locked into the board during a fall, the rider's knees, ankle's, and hips may be compromised and injured further.

As a result, a solution is needed that allows riders to easily and safely perform maneuvers, while at the same time not hindering or restricting a rider's hands or feet or ability to quickly disconnect from the skateboard in dangerous conditions.

BRIEF SUMMARY OF THE INVENTION

The present disclosure provides a unique skateboard deck. Various examples of the deck are provided herein.

The subject matter disclosed herein provides a skateboard deck with comparatively extreme curves at the front nose and rear tail of the board. While conventional skateboard decks typically have a front nose and rear tail that angle only slightly upward from the deck, for example, the angle between the main body portion and the front nose or rear tail may be about 105 to about 135 degrees. In contrast, the skateboard deck taught herein includes a front nose and rear tail that create an acute angle with the main body. The comparatively extreme angle of the front nose and rear tail in the present deck enable a rider to exert outward pressure through the rider's feet to engage the deck so that the rider can jump into the air as if strapped into the board and control the board while airborne. The skateboard deck may be useful as a trainer for beginner skateboarders, as well as enabling advanced riders to further push the boundaries of tricks that are possible on a skateboard.

The present disclosure provides a skateboard deck including a front nose portion, a rear tail portion, and a body between the front nose portion and the rear tail portion. The front nose portion and rear tail portion are angled with respect to the body. For example, an angle between the front nose portion and the body may be less than 90 degrees. Similarly, an angle between the rear tail portion and the body may be less than 90 degrees.

The skateboard platform is designed such that a user's feet may be placed on the body, wherein the front nose portion and rear tail portion extend over a portion of a top surface of the user's feet. In other words, the front nose portion and rear tail portion slightly cup a user's feet such that the user may jump up and maintain contact with the skateboard platform. However, the front nose portion and rear tail portion does not hinder a user from a safety perspective, as the user's feet may easily disengage with the board during an accident. In other words, the user's feet are not locked into the board such that upon an accident or crash the possibility of injury in increased owing to the user's feet being locked into the board.

An advantage of the present skateboard platform is safely enabling users to perform jumps into the air without knowing basic maneuvers such as the "ollie." The board may be used in complex aerials that normally require the rider to grab the board with his hand, which gives the rider an entirely new and easier experience.

A further advantage of the present skateboard deck is that it enables users to ride with their hands and feet free to pump, balance, jump, and fall safely.

Another advantage of the present skateboard deck is the absence of constricting or heavy parts of the board, i.e., no special shoes or handles that create a safety hazard.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the description.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
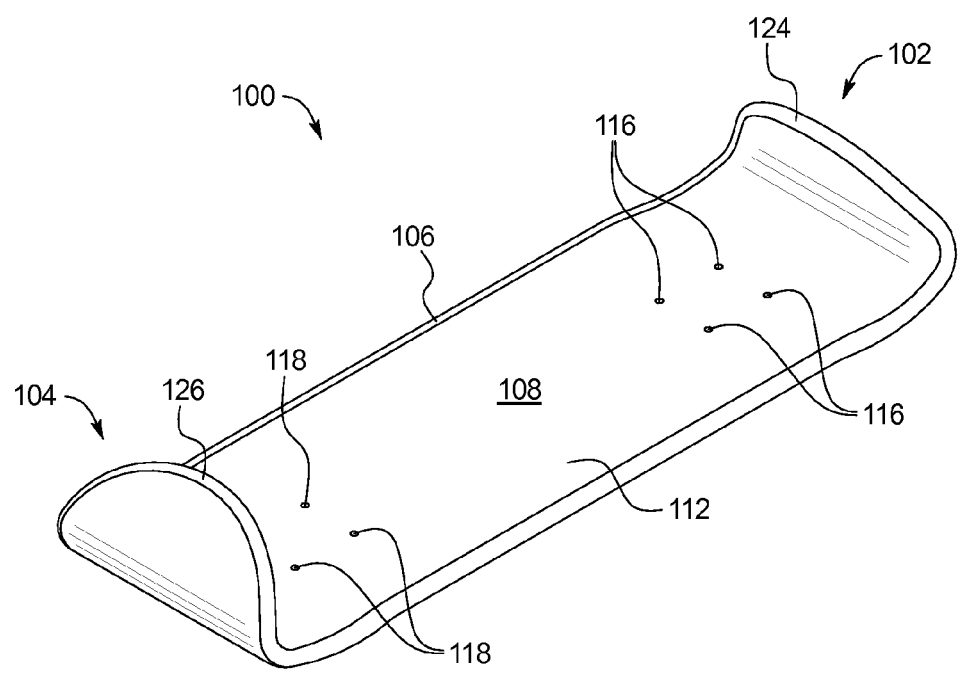
FIG. 1 is a perspective view of an embodiment of the skateboard deck disclosed herein.

The present disclosure provides a skateboard deck 100 including a nose portion 102 and a tail portion 104 that curve up and back towards the center of the deck 100, as shown in FIG. 1. The skateboard deck 100 enables a rider to press his feet against inner surfaces of the nose and tail portions of the board to keep the board in contact with his feet during jumps and lifts.

For example, a body 106 of the skateboard deck 100 may include a front nose portion 102 and a rear tail portion 104. A main horizontal portion 108 of the body 106 extends between the nose and tail portions 102, 104 along a longitudinal centerline 110. In the illustrated embodiment, a top surface 112 of the horizontal portion 108 is concave, although other embodiments may include a planar top surface 112. Further, the nose and tail portions 102, 104 are positioned along the longitudinal centerline 110 equidistant from a lateral centerline 114 of the body 106. The body 106 may also include first and second pluralities 116, 118 of bolt holes that receive trucks (not shown) for connecting wheels to the skateboard deck 100.

The body 106 also includes a forwardmost surface 120 located along the nose portion 102 and a rearmost surface 122 located along the tail portion 104. Parallel to the lateral centerline 114, the forwardmost and rearmost surfaces 120, 122 are positioned along the longitudinal centerline 110 at points farthest from the lateral centerline 114. In the illustrated embodiment, the forwardmost and rearmost surfaces 120, 122 are along curved surfaces of the nose and tail portions 102, 104, respectively.

Figure 2A:
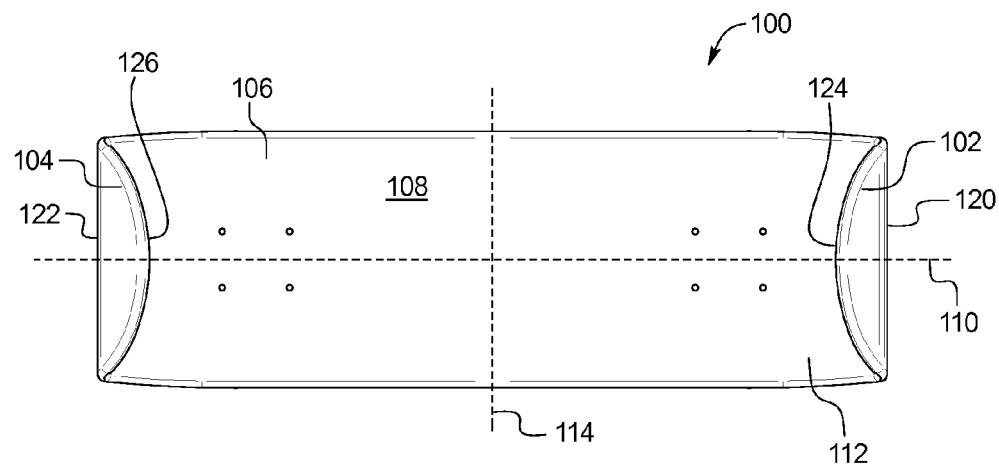
FIG. 2A is a plan view of an example of the skateboard deck disclosed herein.
Figure 3A:
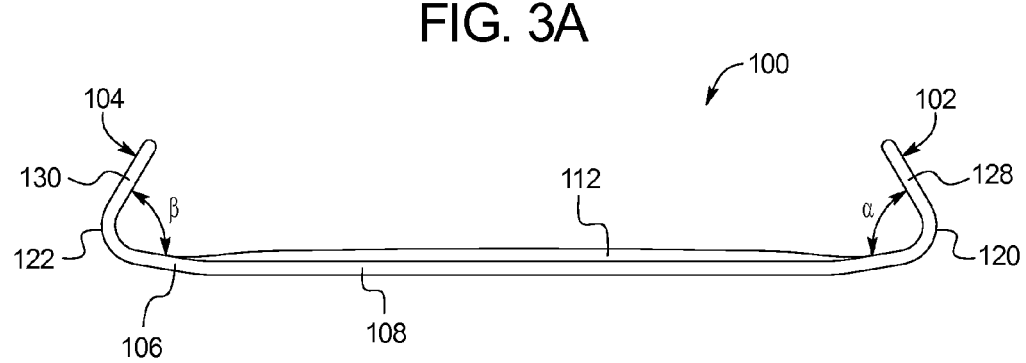
FIG. 3A is a cross-sectional side view of an example of the skateboard deck.

Referring to FIGS. 1, 2A, and 3A, the nose portion 102 curves upwardly and inwardly such that a nose apex 124 is positioned above the main portion 108 of the body 106. Similarly, the tail portion 104 curves upwardly and inwardly such that a tail apex 126 is positioned above the main portion 108 of the body 106. The apices 124, 126 of the illustrated embodiment are rounded, although any shape or geometry may be used.

The nose and tail portions 102, 104 are angled with respect to the main, generally horizontal portion 108 of the body 106. In the embodiment shown in FIG. 3A, each of the nose and tail portions 102, 104 includes a planar surface 128, 130 extending inwardly from the forwardmost and rearmost 124, 126 surfaces towards the lateral centerline 114. An angle α between the planar surface 128 of the front nose portion 102 and the horizontal portion 108 of the body 106 may be less than 90 degrees. Similarly, an angle β between the planar surface 130 of the rear tail portion 104 and the horizontal main portion 108 of the body 106 may be less than 90 degrees. For example, as shown in the top view in FIG. 2A, the front nose portion 102 and rear tail portion 104 fold over at least a portion of the main portion 108 of the body 106. A cross section of the apparatus is in the shape of a modified "C," as shown in FIG. 3A.

Figure 2B:
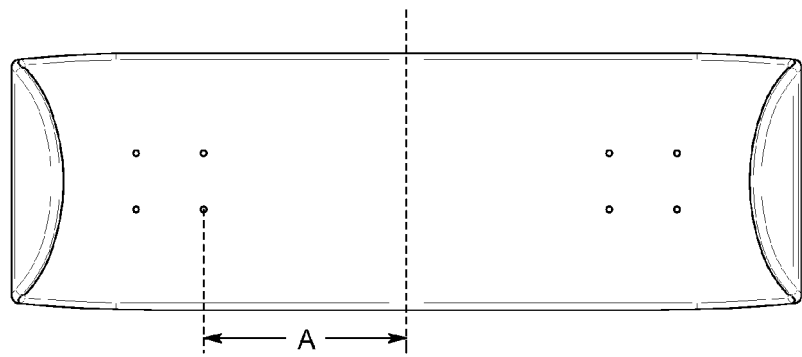
FIG. 2B is a plan view identical to FIG. 2A illustrating sample dimensions of the skateboard deck.
Figure 3B:
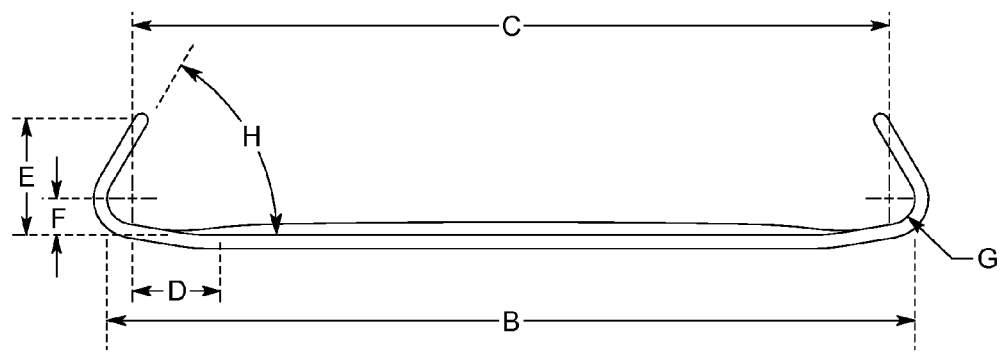
FIG. 3B is a cross-sectional side view identical to FIG. 3A illustrating sample dimensions of the skateboard deck.

Example dimensions of the embodiment illustrated in FIGS. 2B and 3B are provided in the table below. The following dimensions are exemplary only and not limiting.

TABLE 1

| | Dimension (inches) |
|---|---|
| FIG. 2B | |
| A | 6.38 |
| FIG. 3B | |
| B | 24.00 |
| C | 22.50 |
| D | 2.5 |
| E | 3.5 |
| F | 1.07 |
| G | 0.75 (radius of curvature) |
| H | 60 degrees |

Specifically, the generally horizontal main portion 108 may include a deck top surface 112 and a deck bottom surface, the front nose portion 102 may include a nose top surface and nose bottom surface, and the rear tail portion 104 may include a tail top surface and tail bottom surface. The angle between the nose top surface and deck top surface is 90 degrees or less. Similarly, the angle between the tail top surface and the deck top surface is 90 degrees or less.

The main portion 108, the front nose portion 102, and the rear tail portion 104 may be one piece of material. Alternatively, the front nose portion 102 and rear tail portion 104 may be separate pieces that are attached to the main portion 108. For example, the front nose portion 102 and the rear tail portion 104 may be attached to the main portion 108 by any suitable fastener, such as a bolt, nail, latch, or adhesive, among others.

The skateboard deck 100 may be made with any suitable materials. For example, the skateboard deck 100 may include stacked thin wood veneers that undergo custom cold press to adhere the wood together. In an example, the platform may include between seven and thirteen layers, preferably eleven layers, of thin wood veneers pressed together. The veneers take on the shape of the deck 100 after the application of extreme pressure and the lapse of adequate time for the glue to dry. Of course, the deck 100 may be made of out of plastic, such as injection-molded plastic, or any other suitable material. Further, the horizontal portion 108 may be made out of the same or different material than the front nose portion 102 and/or the rear tail portion 104.

In one embodiment the positionings of the nose apex 124 and the tail apex 126 are rigid. In a further embodiment the angles α, β of the front nose portion 102 and the rear tail portion 104 are both adjustable by the user. For example, as a rider becomes more advanced, the front nose portion 102 and rear tail portion 104 may be adjusted to increase the angle α between the front nose portion 102 and the main portion 108. Similarly, the angle β between the rear tail portion 104 and the main portion 108 may be increased. Alternatively, the rider may adjust the front nose portion 102 or the rear tail portion 104 such that one angle is increased, whereas the remaining portion remains positioned to cup at least one foot of the rider.

In an embodiment, a skateboard system is disclosed herein including the front nose portion 102 and rear tail portion 104, wherein the front nose portion 102 and rear tail portion 104 are configured to attach to any conventional skateboard. For example, the front nose portion 102 and rear tail portion 104 are modular such that they can easily connect to the ends of conventional skateboards. In an example, the front nose portion 102 and rear tail portion 104 slide or snap into the ends of a conventional skateboard.

Notwithstanding the fact that the present disclosure is directed to a skateboard platform, it should be understood that the disclosed platform is equally applicable to any number of athletic boards including, but not limited to, snowboards, snow skates, water skates, wake boards, mountain boards, long boards, surfboards, kite boards, balance trainers, and wind surfing boards, among others.

It should be noted that various changes and modifications to the embodiments described herein will be apparent to those skilled in the art. Such changes and modifications may be made without departing from the spirit and scope of the present invention and without diminishing its attendant advantages. For example, various embodiments of the apparatus may be provided based on various combinations of the features and functions from the subject matter provided herein.

I claim:

1. A skateboard deck comprising:
a body with a top surface and a lateral centerline, the body including a nose portion with a nose apex and a tail portion with a tail apex, wherein the nose apex and the tail apex are above the top surface of the body;
wherein a total length of the body spans from a forwardmost surface of the body located along the nose portion to a rearmost surface of the body located along the tail portion, further wherein the nose apex is located between the length defined by the forwardmost surface of the body and the lateral centerline and the tail apex is located between the length defined by the rearmost surface of the body and the lateral centerline;
wherein the nose portion includes a nose planar surface between the forwardmost surface and the nose apex, wherein the tail portion includes a tail planar surface between the rearmost surface and the tail apex, and wherein each of the nose planar surface and the tail planar surface forms an angle of about 60 degrees with the total length of the body; and
wherein each of the nose apex and the tail apex is convexly rounded.

2. The skateboard deck of claim 1 wherein the body includes a longitudinal centerline and wherein the forwardmost and rearmost surfaces are located along the longitudinal centerline farthest from the lateral centerline.

3. The skateboard deck of claim 1, wherein the nose portion includes a radius of curvature of about 0.75 inches between the planar surface and the body.

4. The skateboard deck of claim 1, wherein the tail portion includes a radius of curvature of about 0.75 inches between the planar surface and the body.

5. The skateboard deck of claim 1, wherein the body includes first and second pluralities of bolt holes that receive first and second trucks, respectively.

6. A skateboard deck comprising:
a body including a nose portion, a tail portion, and a horizontal portion including a lateral centerline between the nose portion and the tail portion;
wherein the horizontal portion includes a concave top surface;
wherein the nose portion curves upwardly above the top surface and inwardly towards the lateral centerline so that the nose apex is positioned above the horizontal portion;
wherein the tail portion curves upwardly above the top surface and inwardly towards the lateral centerline so that the tail apex is positioned above the horizontal portion; and
wherein the nose apex and the tail apex are convexly rounded; and
wherein the nose portion includes a nose planar surface, wherein the tail portion includes a tail planar surface, and wherein each of the nose planar surface and the tail planar surface forms an angle of about 60 degrees with the total length of the body.

7. The skateboard deck of claim 6, wherein the body includes first and second pluralities of bolt holes that receive first and second trucks, respectively.

8. The skateboard deck of claim 6, wherein the body is formed from a continuous piece of material.

9. The skateboard deck of claim 8, wherein the continuous piece of material is a composite material including eleven layers of wood veneers.

10. The skateboard deck of claim 6, wherein at least one of the nose portion and the tail portion is a separate piece that attaches to the horizontal portion of the body.

11. A skateboard deck comprising:
a body including a nose portion having a nose apex, a tail portion having a tail apex, and a lateral centerline between the nose portion and the tail portion;
wherein the nose apex is closer to the lateral centerline than a forwardmost surface of the body; and
wherein the tail apex is closer to the lateral centerline than a rearwardmost surface of the body;
wherein each of the nose portion and the tail portion curve toward the lateral centerline to form a partially concave surface facing the body;
wherein the nose portion includes a nose planar surface between the forwardmost surface and the nose apex, wherein the tail portion includes a tail planar surface between the rearmost surface and the tail apex, and wherein each of the nose planar surface and the tail planar surface forms an angle of about 60 degrees with the total length of the body; and
wherein each of the nose apex and the tail apex is convexly rounded.

12. The skateboard deck of claim 11, wherein the positioning of at least one of the nose apex and the tail apex is rigid.

* * * * *